(No Model.)

C. W. ROGERS.
Gig Saddle.

No. 236,842.  Patented Jan. 18, 1881.

Witnesses:
Geo. A. Boyden,
A. E. Eader

Inventor:
Chas. W. Rogers
By his Atty
Chas. B. Mann

UNITED STATES PATENT OFFICE.

CHARLES W. ROGERS, OF BALTIMORE, MARYLAND.

GIG-SADDLE.

SPECIFICATION forming part of Letters Patent No. 236,842, dated January 18, 1881.

Application filed July 30, 1880. (No model.)

*To all whom it may concern:*

Be it known that I, CHARLES W. ROGERS, a citizen of the United States, residing at Baltimore, in the county of Baltimore and State of Maryland, have invented certain new and useful Improvements in Gig-Saddles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in the art of constructing gig-saddle pads for harness, and will be first described, and then designated in the claims.

Figure 1:
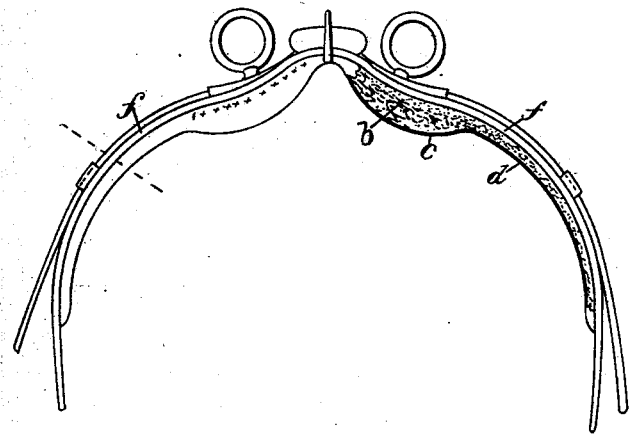
Figure 2:
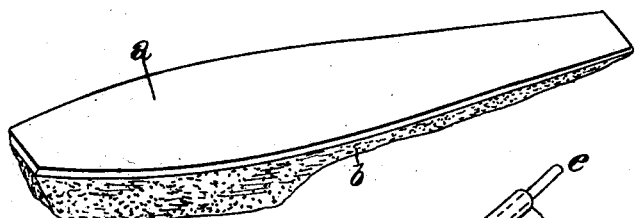
Figure 3:
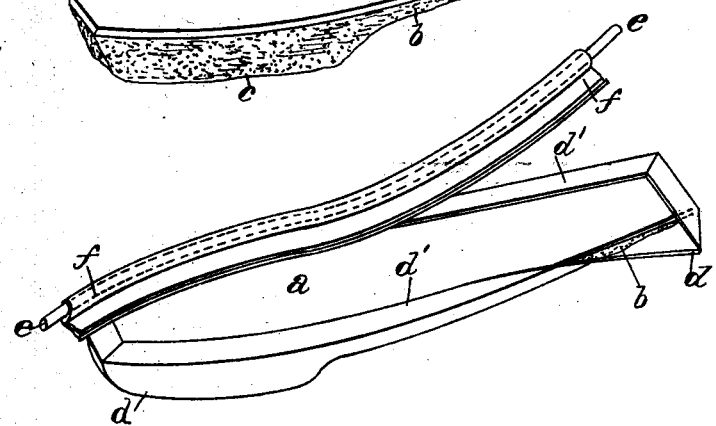
Figure 4:
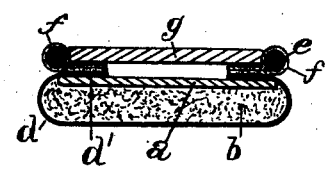

In the drawings hereto annexed, Figure 1 is a view of a gig-saddle made in accordance with my improvement. Fig. 2 is a perspective view of the pad-stuffing without cover, backed with straw-board. Fig. 3 is a perspective view of same with the cover pasted down on the straw-board. Fig. 4 is a cross-section of same.

The pads of gig-saddles should be extra thick where the iron tree rests in them. The ordinary method of making a pad is, first, to cover the reeds by wrapping a strip of enameled leather around each reed and sewing it; second, sew together the outer side and inner side parts of the pad-cover with the wrong surface of each part turned outward, and include in each of the two seams one of the wrapped reeds, placing the latter between the aforesaid parts of the pad-cover, so as to inclose them; third, slit the outside part of the cover, about the center, from end to end, and turn the parts of the cover right surface outward, thereby also bringing the wrapped reeds outward; fourth, sew together the edges of the outer side part which was slit; fifth, stuff the pad-cover, which is now in the form of a jacket or tube. In addition to this being an expensive method of making pads, owing to the greater labor involved, any material which can be inserted into the pad-cover in this way is certain to soon mat down flat and spread out at each side, and by thus changing its shape let the iron tree come in contact with the animal's back.

My invention has for its object to so prepare the pad as to lessen its cost, and to use such material for the stuffing that the above-recited objections are obviated.

The first step in my improvement in the manufacture of gig-saddle pads is to cut from straw-board a piece, *a*, the size and shape required for the pad. The felt *b* is then cut to correspond, and is pasted fast to the straw-board, as shown in Fig. 2. The extra thickness at *c* is made by cutting one or more small pieces of felt and pasting them on top of the larger piece and trimming the thick part the desired shape. The inner side part of the pad-cover *d*, of any suitable material, is then cut out and laid over the felt form, the edges of the cover being drawn over the straw-board back, as shown at *d'*, and pasted thereon. By wrapping the inner side part of the cover over the pad-form and pasting the edges *d'* upon the outer side of the straw-board, a saving is effected of the labor involved in the second, third, and fourth operations by the ordinary method, and which labor constitutes about one-half of the labor in making ordinary stuffed pads. It will be seen the cheap straw-board *a*, as the outer side part of the pad-cover, is substituted for the more expensive material—such as cloth or thin leather—ordinarily employed. The reed *e* is then covered with a strip of leather, *f*, which may be sewed by the machine, and the reed-cover *f* is then placed upon the pasted edges *d'* of the inner side part of the pad-cover and stitched by hand to the back of the covered pad, the stitching running entirely through the thin part of the pad. The flap *g*, which is attached to the tree, is then laced to the facing of the reed-cover.

The straw-board as the outer side cover of the pad is not only cheaper, but, on account of its greater stiffness when a piece of proper thickness is used, is superior to the cloth or thin leather generally employed, for the reason that being stiff the enameled-leather flap may be thinner, and consequently cheaper, than is allowable in pads made in the ordinary way.

A pad constructed in this manner is inexpensive, requires no great skill in its manufacture, and will not mat or flatten down at the thick part.

Having described my invention, I claim and desire to secure by Letters Patent of the United States—

As an improvement in the art of making pads for gig-saddles, the process consisting of attaching felt stuffing $b$, of the required form and size, to a back, $a$, of straw-board, wrapping the inner side cover, $d$, over the felt form and drawing its edges over the outer side of the straw-board back, and securing the same, and placing the covered reed upon the edges $d'$ of the inner side part of the cover, and stitching the reed-cover $f$ to the back of the covered pad, as herein described.

In testimony whereof I affix my signature in presence of two witnesses.

CHARLES W. ROGERS.

Witnesses:
 CHAS. B. MANN,
 W. A. NUMSEN.